United States Patent
Okamoto

(10) Patent No.: US 9,103,265 B2
(45) Date of Patent: Aug. 11, 2015

(54) FREEZE DETECTING DEVICE FOR ACTIVE SHUTTER OF VEHICLE

(71) Applicant: Fuji Jukogyo Kabushiki Kaisha, Tokyo (JP)

(72) Inventor: Yohei Okamoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/174,665

(22) Filed: Feb. 6, 2014

(65) Prior Publication Data
US 2014/0230760 A1    Aug. 21, 2014

(30) Foreign Application Priority Data
Feb. 20, 2013   (JP) ................................. 2013-031344

(51) Int. Cl.
*B60K 11/08* (2006.01)
*F01P 7/02* (2006.01)
*B60K 35/00* (2006.01)

(52) U.S. Cl.
CPC ............... *F01P 7/026* (2013.01); *B60K 11/085* (2013.01); *B60K 35/00* (2013.01); *B60K 11/08* (2013.01)

(58) Field of Classification Search
CPC ............................. B60K 11/08; B60K 11/085
USPC .................. 123/41.04–41.07; 180/68.1, 68.2; 701/29.1, 49
See application file for complete search history.

(56) References Cited

U.S. PATENT DOCUMENTS

| 8,336,509 B2* | 12/2012 | Kim ........................... 123/41.04 |
| 8,645,028 B2* | 2/2014 | Mochizuki ....................... 701/49 |
| 8,731,783 B2* | 5/2014 | Hayakawa et al. .............. 701/49 |
| 2006/0095178 A1* | 5/2006 | Guilfoyle et al. ............... 701/36 |
| 2011/0288717 A1* | 11/2011 | Yu et al. .......................... 701/49 |

FOREIGN PATENT DOCUMENTS

JP    2007-001503 A    1/2007

* cited by examiner

Primary Examiner — Lindsay Low
Assistant Examiner — Kevin Lathers
(74) Attorney, Agent, or Firm — McGinn IP Law Group, Pllc

(57) ABSTRACT

A freeze detecting device for an active shutter of a vehicle includes an engine control unit that outputs an opening signal, opens an active shutter, takes in travelling wind to an engine compartment, and inhibits heat damage when an external air temperature is at or below a freezing determination temperature and also a load state is high. On the other hand, when an opening signal is output from the engine control unit but the active shutter does not perform an opening action, a determination of being frozen solid is made, a warning is displayed on the display to warn the vehicle driver.

12 Claims, 4 Drawing Sheets

FREEZE DETECTING DEVICE FOR ACTIVE SHUTTER OF VEHICLE

CROSS-REFERENCE TO RELATED APPLICATIONS

The present application claims priority from Japanese Patent Application No. 2013-031344 filed on Feb. 20, 2013, the entire contents of which are hereby incorporated by reference.

BACKGROUND

1. Technical Field

The present invention relates to freeze detecting devices for an active shutter of a vehicle, which detects freezing of an active shutter.

2. Related Art

As is widely known, in a vehicle such as an automobile, travelling wind (cooling air) is directed into the moving vehicle through an opening formed on a front bumper, a front grill or the like provided on the front of the vehicle. The travelling wind that is brought in is guided to a heat exchanger such as a radiator and a condenser for an air conditioning device provided on the front of an engine compartment to cool them.

When the travelling wind is guided into the engine compartment through the heat exchanger, the wind causes turbulent flow in the engine compartment and increases air resistance, thereby leading to poor fuel economy. Therefore, it is desirable for the travelling wind that passes through the heat exchanger to be the minimal amount.

As a technique to control the travelling wind that passes through the heat exchanger, for example, a technique to control the amount of travelling wind that passes through is disclosed in Japanese Unexamined Patent Application Publication 2007-1503, in which an active shutter is provided between the front grill and the heat exchanger, and the active shutter is opened and closed with a shutter control device according to the vehicle speed and the temperature of cooling water and so forth.

By using this shutter control device, when the engine temperature is low in a cold environment such as in winter, the active shutter is fully closed and the travelling wind that passes through the heat exchanger is reduced, ambient temperature fall in the engine compartment is suppressed, and heat loss from auxiliary equipment such as the engine, an oil pan, an alternator, a compressor, and the like can be suppressed. Further, by fully closing the active shutter, the travelling wind guided into the engine compartment is reduced, the occurrence of turbulent flow in the engine compartment is suppressed and air resistance is reduced, whereby fuel efficiency can be improved.

On the other hand, when the travelling wind temperature is high and the engine temperature is relatively high in a hot environment such as in summertime, the active shutter is fully opened and the travelling wind is actively taken into the engine compartment to cool the heat exchangers, while the various devices such as the engine, oil pan, alternator, compressor and the like are cooled as done in the normal condition, whereby heat damage can be suppressed.

In the case that the external air temperature is lower than the temperature at which freezing starts (freezing temperature) (hereinafter referred to as a "low external air temperature"), the above-mentioned shutter control device fully closes off the active shutter so as to inhibit excessive cooling in the engine compartment and to quickly increase the internal temperature.

However, in the case that high load driving state is continuous, such as high load driving at a low speed or continuously driving up a hill, the engine temperature and transmission temperature readily increases even during the driving when the external air temperature is low. Accordingly, in order to inhibit heat damage by the increase in temperature in the engine compartment, in the case that the temperature in the engine compartment exceeds a predetermined threshold, the shutter control device opens the active shutter even during driving when the external air temperature is low.

However, the active shutter is easy to freeze during the driving when the external air temperature is low, and where even if a driving signal to open an actuator provided to the active shutter is output from the shutter control device, the active shutter sometimes does not open. If the driver continues high load driving without noticing that the active shutter is frozen, the engine compartment will constantly maintain a high temperature, components made from rubber or resin that are disposed in the periphery of the heat source such as the engine or transmission may incur heat damage, aging degradation may advance, and life-span may be shortened.

SUMMARY OF THE INVENTION

In order to address the above situation, it is an object of the present invention to provide a freeze detecting device for an active shutter of a vehicle which can suppress the temperature increase in an engine compartment and effectively protect from heat damage components disposed in the periphery of heat sources, even in if the active shutter is frozen.

An aspect of the present invention provides a freeze detecting device for an active shutter of a vehicle including: an air temperature detector to detect external air temperature; a load determiner to determine whether the load state of a heat source provided in an engine compartment is high or not; a shutter to open and close an external air inlet that is open in the front of the engine compartment; a driving mechanism to drive the shutter; a controller to control the driving mechanism; and an action detector to detect the active state of the driving mechanism. The controller includes: an opening action instructing unit to output an opening signal to the driving mechanism, in the case that the external air temperature detected by the external air temperature detector is at or below a freezing determination temperature and the load determiner has determined that the load is high; a freeze determiner to estimate a freezing state, in the case that the action detector has not detected an action by the driving mechanism in the event that an opening signal from the opening action unit is output to the driving mechanism; and a warning display instructing unit to display a warning on a display, in the case that a freezing state is determined by the freeze determiner.

The controller may have a radiator fan action instruction unit to turn on the radiator fan in the case that a freezing state is determined by the freeze determiner.

The controller may continue the warning display by the warning display instruction unit until the load determiner determines that the load state is not high.

BRIEF DESCRIPTION OF THE DRAWINGS

FIG. 4A is a descriptive diagram illustrating a display example of the event when freezing is detected, and FIG. 4B is a descriptive diagram illustrating a display example of providing a warning to a driver.

DETAILED DESCRIPTION

Figure 1:
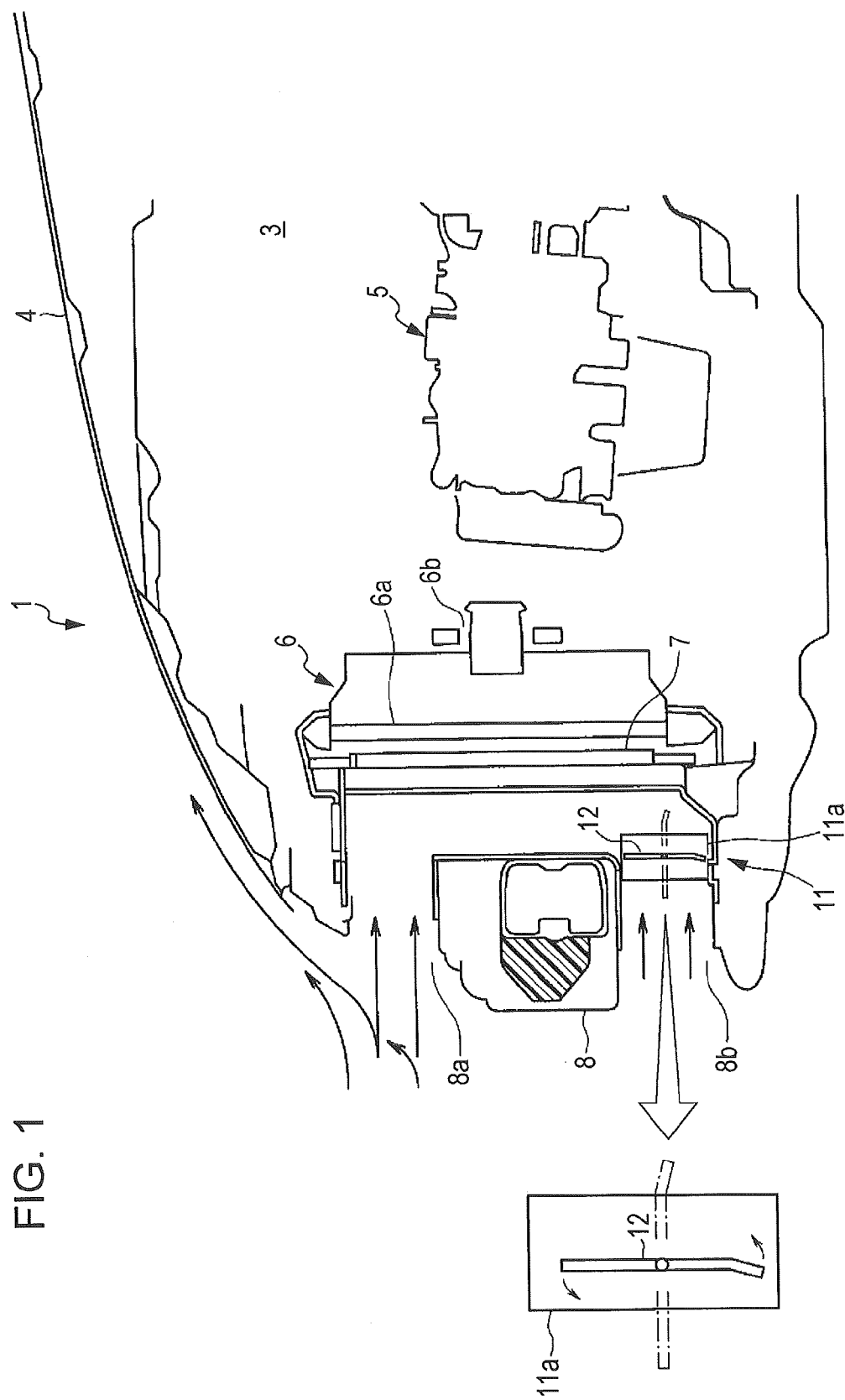
FIG. 1 is a sectional side view of the front of a vehicle body.

Hereinafter, an implementation of the present invention will be described with reference to the drawings. As illustrated in FIG. 1, an engine compartment 3 provided to a vehicle body front part 1 of a vehicle such as an automobile has a structure covered with a front hood 4 that can open and close. An engine 5 is mounted in the engine compartment 3, and an unillustrated transmission (automatic transmission in the present invention) is connected to the engine 5. An unillustrated cabin is provided on the back part of the engine compartment 3 via a toe board.

A radiator 6a which is provided to a radiator unit 6 is disposed in the front of the engine compartment 3. A condenser 7 of an air conditioning device is disposed in front of the radiator 6a, and a radiator fan 6b is provided behind the radiator 6a. A front bumper 8 is disposed at the front end of the vehicle body front part 1, that is, in front of the radiator unit 6. Note that the radiator fan 6b is operated according to control signals output from a later-described air conditioning control unit (A/C_ECU).

A front bumper 8 has a front grill 8a that has an upper external air inlet on the upper portion and a lower external air inlet 8b is opened on the lower portion of the front bumper 8. A known active shutter 11 is disposed at a predetermined position on the lower external air inlet 8b. The active shutter 11 has a rectangular-shaped duct frame 11a that is formed in substantially the same dimensions as the inner periphery of the lower external air inlet 8b, and the rear portion of the duct frame 11a is disposed so as to face the lower portion of the radiator 6a and the condenser 7. Further, a shaft (unillustrated) on each end in the direction of the vehicle width of a louver 12 that controls the amount of external air passing through is turnably supported on the duct frame 11a, and the shaft is connected to a driving motor 17 (see FIG. 2) so as to serve as the driving mechanism of the present invention, via a linking mechanism. The driving motor 17 is a reversible motor that turns back and forth between 0° and 90°, based on signals output from a later-described shutter control unit (shutter_ECU) 25, and the louver 12 is operated to be fully closed or fully opened by the turning the driving motor 17.

An engine control unit (E/G_ECU) 21 serving as the controller of the present invention that controls the engine 5, a transmission control unit (TCU) 22 that controls an unillustrated automatic transmission, an air conditioning control unit (A/C_ECU) 23 that controls the air conditioning device, a meter control unit (meter_ECU) 24 that controls the overall combination instrument disposed in an instrument panel or the like at the front of the cabin and a multifunction display (MFD) 27 serving as the display unit of the present invention, and the shutter control unit (shutter_ECU) 25 are connected so as to allow mutual communication through an in-vehicle LAN 26 such as a CAN (Controller Area Network) or the like. The ECUs 21 through 25 are made up of a microcomputer having a CPU and a memory such as ROM and RAM, and fixed data such as control programs and various types of maps are stored in the ROM.

The E/G_ECU 21 has a function to perform opening/closing control of the active shutter 11, in addition to the control of the entire engine 5. That is to say, the E/G_ECU 21 opens and closes the louver 12 provided on the active shutter 11, based on parameters detected by the various sensors 13 (e.g. the cooling water temperature detected by a water temperature sensor serving as the load determiner of the present invention), and parameters such as the basic fuel injecting amount found by the E/G_ECU 21, automatic transmission oil temperature detected by an oil temperature sensor 14 serving as the load determiner that are connected with the TCU 22, and a coolant pressure detected by a coolant pressure sensor 15 that is connected with the A/C_ECU 23, the external air temperature detected by the eternal temperature sensor 16 serving as the external air temperature detector of the present invention connected with the meter_ECU 24, and the like. When the engine compartment 3 is relatively cool, the louver 12 is fully closed, whereby travelling wind that passes through the heat exchangers (radiator 6a and condenser 7) is reduced, and over-cooling of the heat exchanger is inhibited. Since the travelling wind brought into the engine compartment is suppressed by fully closing the louver 12, the occurrence of turbulent flow in the engine compartment is suppressed, whereby air resistance (CD value) is reduced and fuel efficiency improves. On the other hand, when the travelling wind temperature is high and the temperature of the heat sources (such as engine 5 and automatic transmission) is relatively high, such as in summertime, travelling wind can be actively brought into the engine compartment 3 and the cooling efficiency of the heat exchangers (such as the radiator 6a and the condenser 7) is increased by opening the louver 12, while the heat sources (such as the engine 5, the automatic transmission, and auxiliary equipment including an alternator and compressor) are cooled as done in a normal condition, whereby heat damage is prevented. Further, by cooling these heat sources, components having weak heat resistance such as components made from rubber or resin that are disposed in the periphery thereof are protected from heat damage.

Figure 2:
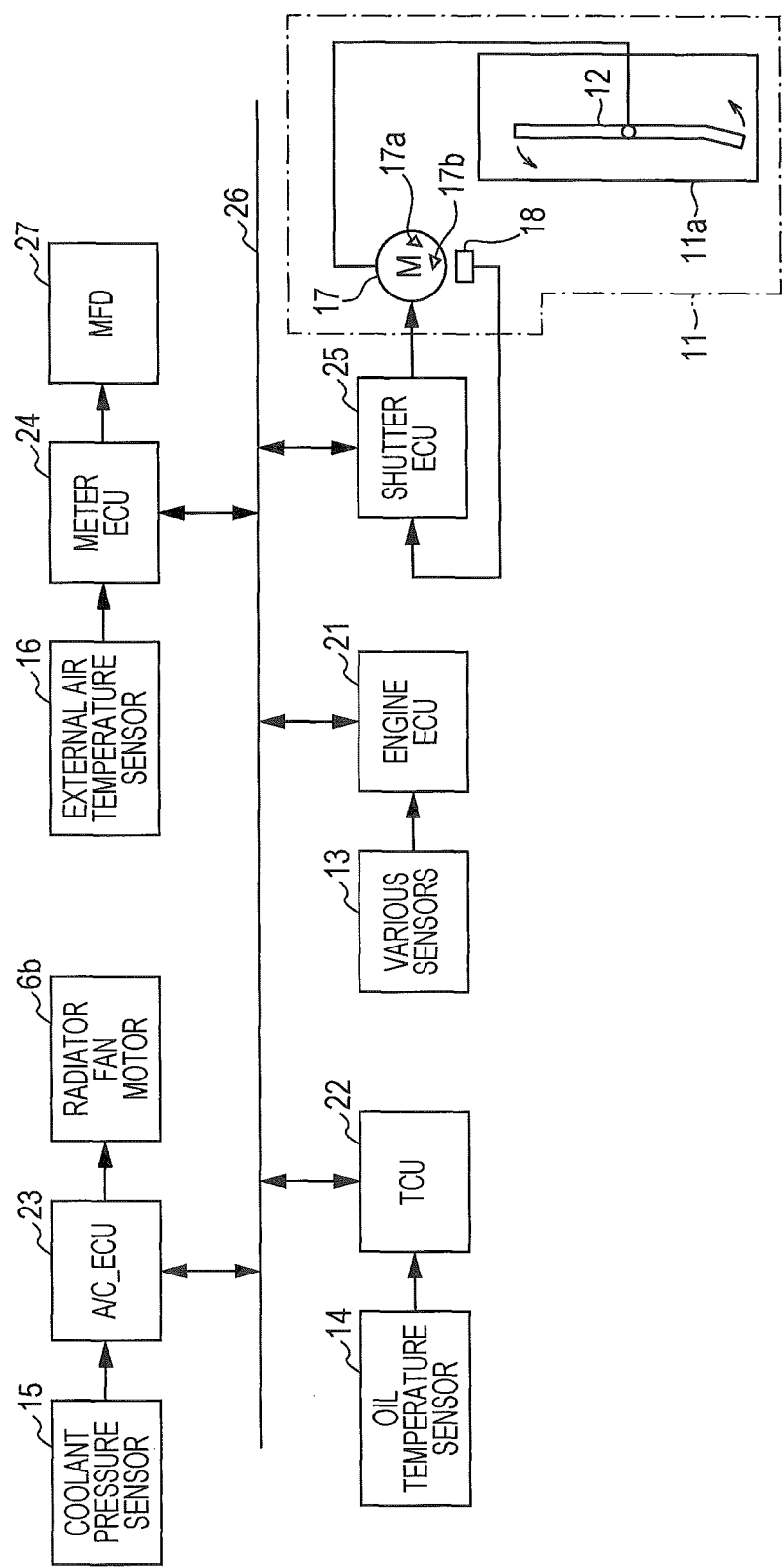
FIG. 2 is an overall configuration of a vehicle control system.

The shutter_ECU 25 outputs forward rotation/backward rotation driving signals as to the driving motor 17, according to the open/close instruction signals from the E/G_ECU 21. As illustrated in FIG. 2, an action detecting sensor 18 serving as the action detector of the present invention such as a Hall device is provided to the motor shaft of the driving motor 17, and a fully open position index 17a and a fully closed position index 17b made from magnets or the like are fixed onto the motor shaft. The driving motor 17 turns back and forth between a substantially vertical fully closed position that is illustrated by a solid line in FIG. 1 and a horizontal fully open position illustrated by a dotted line in FIG. 1. Data on turning angles to turn back and forth between the fully closed position and fully open position of the driving motor 17 are stored beforehand, and the driving motor 17 opens or closes the louver 12 based on an open action signal or a close action signal output from the shutter_ECU 25. Note that hereinafter, a closing action of the driving motor 17 will be referred to as "forward turning", and an opening action will be referred to as "backward turning".

The fully open position index 17a and the fully closed position index 17b are defined as angles that approach the fully closed position or fully open position of the driving motor 17. For example, in the case that the angle at the fully closed position is 0° and the angle at the fully open position is 90°, the fully open position index 17a is set at a position of 1 to 3°, and the fully closed position index 17b is set at a position of 87 to 89°. Accordingly, upon outputting the forward turning/backward turning driving signals to the driving motor 17, in the case that a pulse is output from the action sensor detector 18, having detected passage of the position indices 17a and 17b due to a change in the magnetic field, the shutter_ECU 25 determines that the louver 12 has been fully closed or fully opened in a normal manner.

Also, for example, during driving at normal temperatures, if the shutter_ECU 25 has output a driving signal for forward turning/backward turning as to the driving motor 17, but neither or only either of the two pulses from the action detecting sensor 18 is output, it is determined that the louver 12 is not operating in a normal manner, and an error signal is output to the E/G_ECU 21. The E/G_ECU 21 receives the error signal from the shutter_ECU 25, and performs a preset fail-safe action.

Normally, during driving at low external air temperatures, the louver 12 of the active shutter 11 is closed to inhibit over-cooling of the engine compartment 3. However, even during driving during low external air temperatures, the engine compartment 3 readily heats up under the high load state, and thus the louver 12 has to be opened.

In the event of opening the louver 12, in the case that the louver 12 and supporting components that make up the active shutter 11 are frozen solid and inoperable, this situation is temporary and the functionality will return when the external air temperature increases and melting occurs. Therefore the E/G_ECU 21 inhibits the temperature in the engine compartment 3 from rising, while notification is made to warn the driver that the active shutter 11 is frozen solid.

Figure 3:
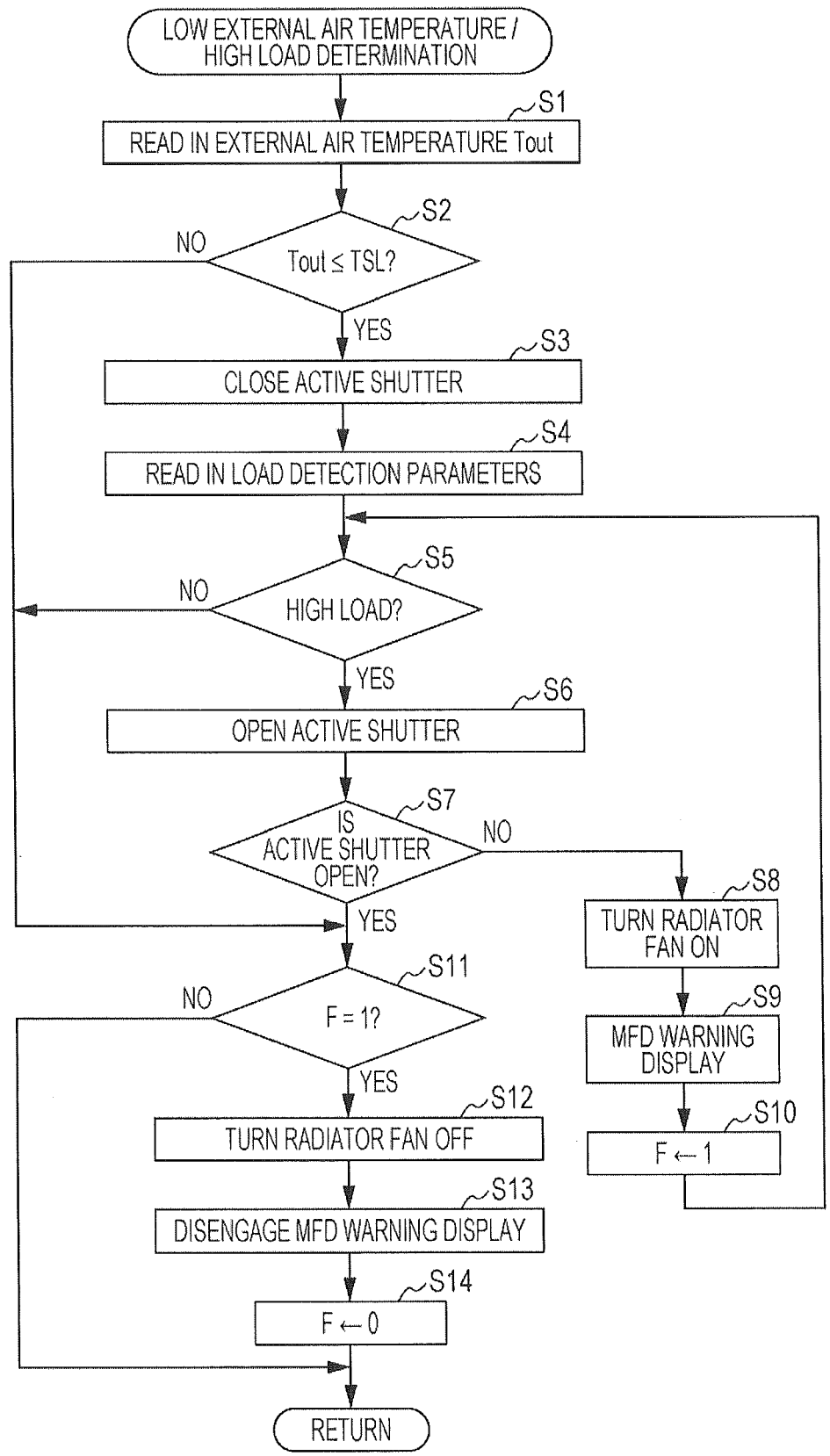
FIG. 3 is a flowchart describing a low external air temperature/high load determining routine.

The determination executed by the E/G_ECU 21 that the active shutter is frozen solid is processed, specifically, according to a low external air temperature/high load determining routine, illustrated in FIG. 3. In this routine, first, in step S1, the external air temperature Tout that has been read in by the external air temperature sensor 16 is read in, and in following step S2, the external air temperature Tout and a preset freezing determination temperature TSL (e.g. approximately −5 to −3 C.°) are compared. In the case that Tout>TSL, it is determined that there is no icing, and the flow skips to step S11. On the other hand, in the case that Tout≤TSL, it is determined that there is the possibility of icing, and the flow advances to step S3.

In step S3, since the external air temperature Tout is a low temperature, a shutter closing signal is output as to the shutter_ECU 25. The shutter_ECU 25 then turns the driving motor 17 of the active shutter 11 forward, and completely closes the louver 12.

Then, the flow is advanced to step S4, where the load detecting parameters are read in. These load detecting parameters are read in to determine whether or not the heat source such as the engine 5 and the transmission is reaching high temperatures due to the high load driving. The examples of the load detecting parameters include parameters detected by the various sensors and sent to the E/G_ECU 21 (cooling water temperature detected by the water temperature sensor, etc.), fuel consumption rates found by the E/G_ECU 21, and an oil temperature of the automatic transmission detected by the oil temperature sensor 14.

Then, the flow is advanced to step S5, where the load detecting parameters that have been read in and the high load determining values that have been individually set beforehand are compared. In the case that at least one of the load detecting parameters exceeds the high load determining value for a predetermined amount of time or longer, this is determined to be under the high load state, and the flow is advanced to step S6. On the other hand, in the case of determining that the value is not under the high load state, the flow skips to step S11. Note that the processing in step S5 corresponds to the load determiner of the present invention.

In step S6, a shutter-opening signal is output to the shutter_ECU 25. The shutter_ECU 25 then turns the driving motor 17 of the active shutter 11 backwards to fully open the louver 12. Note that the processing in step S6 corresponds to the opening instruction unit of the present invention.

In following step S7, determination is made as to whether or not the louver 12 has been opened fully by the driving motor 17 provided on the active shutter 11, by finding whether or not an error signal from the shutter_ECU 25 has been output. Upon receiving an opening signal from the E/G_ECU 21 and outputting a driving signal to the driving motor 17, the shutter_ECU 25 reads in a pulse that is output from the action detecting sensor 18, which is made up of Hall devices or the like, in the event of detecting the passing of two position indices 17a and 17b. In the case that the driving motor 17 is turned backwards to fully open the louver 12, a pulse that detects the passing of the fully open position index 17b is output first, from the action detecting sensor 18, and next a pulse that detects the passing of the fully open position index 17a is output.

Accordingly, in the case that the shutter_ECU 25 has received these two pulses, the louver 12 is determined to be fully opened, and the shutter_ECU 25 outputs a normal signal to the E/G_ECU 21. On the other hand, in the case that a pulse signal that detects the passing of the fully closed position index 17b is not received, or in the case that the pulse that detects the passing of the fully closed position index 17b is received but a pulse that detects the passing of the fully open position index 17a is not received, the louver 12 is estimated to be frozen solid, and the shutter_ECU 25 outputs an error signal to the E/G_ECU 21.

In S7, if the E/G_ECU receives an error signal from the shutter_ECU 25 in step 7, the active shutter 11 is estimated to be frozen solid, and the flow branches out to step S8. On the other hand, if the E/G_ECU receives a normal signal, it is determined that the louver 12 of the active shutter 11 has been normally opened, and the flow is advanced to step S11. Note that the processing in step S7 herein corresponds to the freeze determiner of the present invention.

In step S8, a radiator fan ON signal is output to the A/C_ECU 23. The A/C_ECU 23 then turns the radiator fan 6b on, and actively takes in the travelling wind to cool the engine compartment 3. Note that the processing in step S8 corresponds to the radiator fan action instruction unit according to the present invention.

Figure 4A:
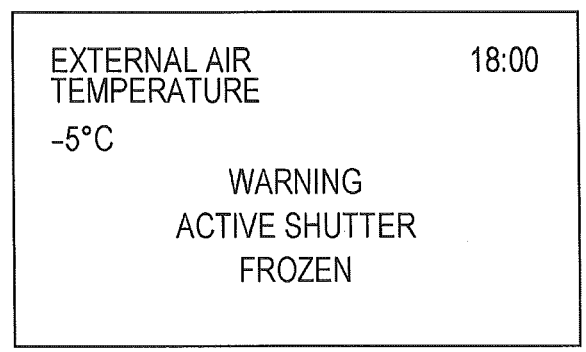
FIGS. 4A and 4B are display examples of notification of a frozen solid of an active shutter, where
Figure 4A:
Figure 4B:
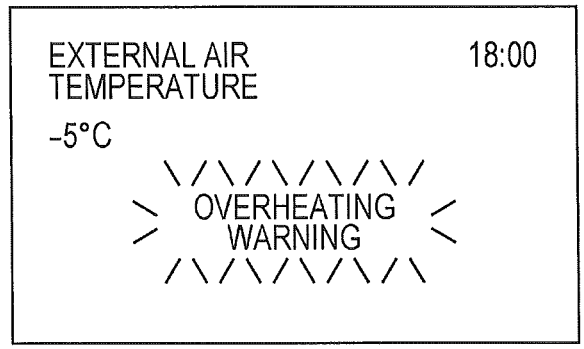

Subsequently, the flow is advanced to step S9, where a warning display signal is output to the meter_ECU 24. The meter_ECU 24 then outputs information on a warning to be displayed to the MFD 27, and advances to step S10. The content of the warning to be displayed on the MFD 27 is exemplified in FIGS. 4A and 4B. In this display example, first, as illustrated in FIG. 4A, a screen that notifies that the active shutter 11 is frozen is displayed for a predetermined amount of time, and next, as illustrated in FIG. 4B, a screen that notifies that there is a possibility of overheating is displayed so as to be flashing for a predetermined amount of time. Note that the processing in step S9 corresponds to the warning display instruction unit of the present invention.

In following step S10, an icing estimation flag F is set (F←1), the flow returns to step S5, and high load determining is performed again. Accordingly, the processing in steps S8 and S9 are continued until the load state becomes not high.

On the other hand, upon advancing from Step S2, S5, or S7 to step S11, the value of the icing estimation flag F is checked, and in the case of F=1, the flow is advanced to step S12, and in the case of F=0, the routine is exited.

In step S12, a radiator fan OFF signal is output as to the A/C_ECU 23 to the radiator fan 6b. The flow then advances to step S13 to cancel the warning display to the MFD 27, and in following step S14, clears the icing estimation flag F (F←0), and the routine is exited.

By recognizing the warning displayed on the MFD 27, a vehicle driver can downshift the transmission, switch the transmission mode to a sports mode for driving at a high transmission ratio, or the like, whereby the engine load is decreased and the increase in temperature of the engine compartment is suppressed. As a result, the components disposed in the periphery of the heat source such as the engine 5 and transmission can be effectively protected from heat damage.

Note that the present invention is not to be limited to the above-described implementation. Alternatively, for example, the warning to notify of freezing solid may be performed audibly in addition to a display by the MFD 27. Also, the driving mechanism is not limited to a driving motor 17, and may be a solenoid. While the shutter_ECU 25 moves the active shutter 11 based on opening/closing signals from the E/G_ECU 21 in the above implementation, the movement of the active shutter 11 may be controlled by the shutter_ECU 25 itself. Accordingly, in this case, the shutter_ECU 25 serves as the controller of the present invention.

The invention claimed is:

1. A freeze detecting device for an active shutter of a vehicle, the freeze detecting device comprising:
an air temperature detector to detect external air temperature;
a load determiner to determine whether the load state of a heat source provided in an engine compartment is high or not;
a shutter to open and close an external air inlet that is open in the front portion of the engine compartment;
a driving mechanism to drive the shutter;
a controller to control the driving mechanism; and
an action detector to detect an active state of the driving mechanism,
wherein the controller comprises:
an opening action instructing unit to output an opening signal to the driving mechanism, in a case that the external air temperature detected by the external air temperature detector is at or below a freezing determination temperature and the load determiner has determined that the load is high;
a freeze determiner to estimate a freezing state, in a case that the action detector has not detected an action by the driving mechanism in the event that an opening signal from the opening action unit is output to the driving mechanism;
a warning display instructing unit to display a warning on a display, in a case that the freezing state is determined by the freeze determiner; and
a second controller to control a radiator fan provided in the engine compartment,
wherein, in a case that the freezing state is determined by the freeze determiner, the second controller outputs a radiator fan ON signal to the radiator fan so as to inhibit a temperature in the engine compartment from rising.

2. The freeze detecting device for an active shutter of a vehicle according to claim 1, wherein the warning display instructing unit displays the warning on the display simultaneously as the second controller outputs the radiator fan ON signal to the radiator fan.

3. The freeze detecting device for an active shutter of a vehicle according to claim 1, wherein the controller displays the warning display by the warning display instruction unit for a predetermined amount of time.

4. The freeze detecting device for an active shutter of a vehicle according to claim 1, wherein after the freezing state is determined by the freeze determiner, the freeze determiner continuously estimates if the freezing state exists.

5. The freeze detecting device for an active shutter of a vehicle according to claim 4,
wherein, in a case that the freeze determiner determines that the freezing state no longer exists, the second controller outputs a radiator fan OFF signal to the radiator fan.

6. A freeze detecting device for an active shutter of a vehicle, the freeze detecting device comprising:
an air temperature detector to detect external air temperature;
a load determiner to determine whether the load state of a heat source provided in an engine compartment is high;
a shutter to open and close an external air inlet that is open in the front portion of the engine compartment;
a driving mechanism to drive the shutter;
a controller to control the driving mechanism; and
an action detector to detect an active state of the driving mechanism,
wherein the controller comprises:
an opening action instructing unit to output an opening signal to the driving mechanism, in a case that the external air temperature detected by the external air temperature detector is at or below a freezing determination temperature and the load determiner has determined that the load is high;
a freeze determiner to estimate a freezing state, in a case that the action detector has not detected an action by the driving mechanism in the event that an opening signal from the opening action unit is output to the driving mechanism; and
a warning display instructing unit to display a warning on a display, in a case that a freezing state is determined by the freeze determiner,
wherein the controller has a radiator fan action instruction unit to turn on the radiator fan in the case that a freezing state is determined by the freeze determiner.

7. The freeze detecting device for an active shutter of a vehicle according to claim 6, wherein the controller continues the warning display by the warning display instruction unit until the load determiner determines that the load state is not high.

8. The freeze detecting device for an active shutter of a vehicle according to claim 6, wherein the warning display instructing unit displays the warning on the display simultaneously as the radiator fan action instruction unit turns on the radiator fan.

9. The freeze detecting device for an active shutter of a vehicle according to claim 6, wherein the controller displays the warning display by the warning display instruction unit for a predetermined amount of time.

10. The freeze detecting device for an active shutter of a vehicle according to claim 6, wherein after the freezing state is determined by the freeze determiner, the freeze determiner continuously estimates if the freezing state exists.

11. The freeze detecting device for an active shutter of a vehicle according to claim 10,
wherein, in a case that the freeze determiner determines that the freezing state no longer exists, the radiator fan action instruction unit turns off the radiator fan.

12. A freeze detecting device for an active shutter of a vehicle, the freeze detecting device comprising:
- an air temperature detector to detect external air temperature;
- a load determiner to determine whether the load state of a heat source provided in an engine compartment is high or not;
- a shutter to open and close an external air inlet that is open in the front portion of the engine compartment;
- a driving mechanism to drive the shutter;
- a controller to control the driving mechanism; and
- an action detector to detect an active state of the driving mechanism,
- wherein the controller comprises:
  - an opening action instructing unit to output an opening signal to the driving mechanism, in a case that the external air temperature detected by the external air temperature detector is at or below a freezing determination temperature and the load determiner has determined that the load is high;
  - a freeze determiner to estimate a freezing state, in a case that the action detector has not detected an action by the driving mechanism in the event that an opening signal from the opening action unit is output to the driving mechanism;
  - a warning display instructing unit to display a warning on a display, in a case that the freezing state is determined by the freeze determiner,
- wherein the controller continues the warning display by the warning display instruction unit until the load determiner determines that the load state is not high.

* * * * *